US008380483B2

(12) United States Patent
Kahlon

(10) Patent No.: US 8,380,483 B2
(45) Date of Patent: Feb. 19, 2013

(54) INTER-PROCEDURAL DATAFLOW ANALYSIS OF PARAMETERIZED CONCURRENT SOFTWARE

(75) Inventor: Vineet Kahlon, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 1538 days.

(21) Appl. No.: 11/867,178

(22) Filed: Oct. 4, 2007

(65) Prior Publication Data

US 2008/0086723 A1 Apr. 10, 2008

Related U.S. Application Data

(60) Provisional application No. 60/828,246, filed on Oct. 5, 2006, provisional application No. 60/884,048, filed on Jan. 9, 2007.

(51) Int. Cl.
*G06F 9/45* (2006.01)
(52) U.S. Cl. .......................................... 703/22; 717/131
(58) Field of Classification Search .................... 703/22; 717/131
See application file for complete search history.

(56) References Cited

PUBLICATIONS

Brazdil et al. "On the Decidability of Temporal Properties of Probabilistic Pushdown Automata", 2005, STACS 2005, LNCS, pp. 145-157.*
Obdrzalek, J. "Model Checking Java Using Pushdown Systems", 2002, 10 pages.*
Emerson et al. "Model Checking Large-Scale and Parameterized Resource Allocation Systems", 2002, TACAS 2002, LNCS 2280, pp. 251-265.*
Emerson et al. "Reducing Model Checking of the Many to the Few", 2000, CADE-17, LNAI 1831, pp. 236-254.*
Reps, et al., "Weighted Pushdown Systems and Their Application to Interprocedural Dataflow Analysis", Science of Computer Programming—Special Issue: Static Analysis Symposium (SAS 2003), vol. 58, Oct. 2005.
Bouajjani et al., "Reachability Analysis of Pushdown Automata: Application to Model-Checking", Concur '97, Concurrency Theory. 8th International Conference Proceedings Jul. 1-4, 1997 Warsaw, Poland.
Esparza, et al., "Efficient Algorithms for Model Checking Pushdown Systems", Proceedings of the 12th International Conference on Computer Aided Verification, 2000.
Emerson et al., "Reducing Model Checking of the Many to the Few", Jan. 1, 2006, Automated Deduction—CADE-17 Lecture Notes in Computer Science: Lecture Notes in Artificial Intelligence; LNCS. Springer, Berlin, DE.
Chaki et al., Verifying Concurrent Message-Passing C Programs with Recursive Calls; TACAS, 2006; 15 pages.
German et al., Reasoning about Systems with Many Processes; J. ACM, vol. 39 No. 4; 1992; pp. 675-735.
Sen et al., Model Checking Multithreaded Programs with Asynchronous Atomic Methods; CAV, 2006; 14 pages.
Bouajjani et al., Reachability Analysis of Multithreaded Software with Asynchronous Communication; FSTTCS; 2005; 12 pages.
Bouajjani et al., A Generic Approach to the Static Analysis of Concurrent Programs with Procedures; IJFCS, vol. 14, No. 4; 2003; pp. 551-562.
Qadeer et al., Summarizing Procedures in Concurrent Programs; POPL; 2004; pp. 245-255.

*Primary Examiner* — Suzanne Lo
(74) *Attorney, Agent, or Firm* — Joseph Kolodka; Bao Tran

(57) ABSTRACT

A system and method for computing dataflow in concurrent programs of a computer system, includes, given a family of threads $(U^1, \ldots, U^m)$ and a Linear Temporal Logic (LTL) property, f, for a concurrent program, computing a cutoff for the LTL property, f, where c is called the cutoff if for all n greater than or equal to c, $U^n$ satisfies f if $U^c$ satisfies f. The cutoff is computed using weighted multi-automata for internal transitions of the threads. Model checking a cutoff number of processes is performed to verify race freedom in the concurrent program.

12 Claims, 3 Drawing Sheets

Given a family of PDSs $U^1, ..., U^m$ and an LTL property f, compute a cutoff for f, where c is called a cutoff if for all $n \geq c$, $U^n$ satisfies f, if $U^c$ satisfies f. This reduces the problem to debugging a system with up to a cutoff number of processes.-12

To compute these cutoffs we use weighted multi-automata. Computation of these cutoffs reduces to pre*-closure computations of weighted automata which can be carried out efficiently in polynomial time in the size of source code. - 14

Once cutoffs have been computed, use parameterized model checking to model check the resulting systems of cutoff size to verify the system and establish e.g., race freedom. The techniques used depend on the communication primitives used by the threads - 16

FIG. 1

INTER-PROCEDURAL DATAFLOW ANALYSIS OF PARAMETERIZED CONCURRENT SOFTWARE

RELATED APPLICATION INFORMATION

This application claims priority to provisional application Ser. No. 60/884,048 filed on Jan. 9, 2007, incorporated herein by reference. This application also claims priority to provisional application Ser. No. 60/828,246 filed on Oct. 5, 2006, incorporated herein by reference.

The present application is related to U.S. application Ser. No. (TBD) filed currently herewith, entitled "MODEL CHECKING PARAMETERIZED THREADS FOR SAFETY" Ser. No. 11/867,160 and incorporated herein by reference.

BACKGROUND

1. Technical Field

The present invention relates to computer system verification and more particularly to verification of concurrent programs, which exploit parameterized qualities of computer systems comprised of many copies of the same hardware or software component.

2. Description of the Related Art

Computer verification is needed to ensure that a computer system operates properly and that the results obtained are trustworthy. One form of verification is testing. In testing, the actual behavior of a system is examined on a set on inputs and matched against an expected result. Due to a large or infinite number of possible inputs, it becomes impossible to confirm that a system behaves correctly in all circumstances.

Verification tries to address these issues. Verification provides a mathematical or model basis for simulating the system behavior. A model and its intended behavior are defined. A machine is usually modeled as a system whose state evolves over time, the model includes a specification of the state space and how the system can traverse it. Temporal logic has been shown to be useful in expressing behavior of reactive systems. The model-checking approach to verification includes taking the mathematical model of the system under consideration and checking the validity of a temporal logic formula within the model.

A primary problem faced by all methods is known as state explosion. State explosion means that the state space of the system under consideration grows rapidly (e.g., exponentially) with the amount of memory used (e.g., registers, or program variable, pointers, etc.). This limits the verification methods.

Multi-threading is a standard way of exploiting parallelism among different components of a computer system. As a result, the use of concurrent multi-threaded programs is becoming pervasive. Examples include operating systems, databases, embedded systems (cell phones, multimedia consumer products) etc. Since verification typically does not scale for large scale concurrent programs, there is a deep interest in leveraging static analysis techniques like inter-procedural dataflow analysis for debugging multi-threaded programs. While inter-procedural dataflow analysis has shown to be a very effective technique for finding bugs for sequential programs, there has been very little work on extending such dataflow analyses to the concurrent domain.

SUMMARY

Concurrent programs with many replicated threads, e.g., running the same piece of code, occur in many important applications. These include implementations of protocols for networking, cache coherence, synchronization and multi-core architectures running multi-threaded software, among others. As a concrete example, we consider Linux™ device drivers. Driver code is supposed to work correctly irrespective of the number of threads executing it. For such applications, the goal is to establish correctness of programs of the form $U_1^{n_1} \| \ldots \| U_m^{n_m}$ irrespective of the program size as measured by the number $n_i$ of threads executing the code for driver $U_i$. In the art, this is often referred to as the Parameterized Model Checking Problem (PMCP). Clearly, this is important as correctness of a system with a fixed number of threads does not, in general, establish correctness for an arbitrary number.

In practice, however, deciding the PMCP is considered a hard problem. Therefore, the approach that is typically followed is to first tackle the seemingly simpler problem of trying to establish correctness for programs with a fixed number (typically 2) of replicated threads. However, we obtain the somewhat surprising result that establishing correctness for a fixed number (even two) of replicated components is, in many important cases, provably less tractable than establishing parameterized correctness.

This has at least two implications. First, when reasoning about parameterized recursive programs, it is important to try to reason directly about parameterized correctness rather than attempt to establish correctness for a special case comprising a small fixed number of replicated threads and successively increasing the number of copies. To illustrate the second, and more important, conclusion of practical interest, we consider the scenario where our end goal is not parameterized reasoning but establishing correctness of a program with a fixed number of, possibly distinct, threads.

Suppose that we want to establish the absence of data races in a program $U_1 \| U_2$ comprised of threads $U_1$ and $U_2$ running two possibly distinct device drivers. Then, if we establish the absence of a data race in the parameterized system $U_1^n \| U_2^m$, comprised of arbitrarily many copies of $U_1$ and $U_2$, it automatically establishes data race freedom for $U_1 \| U_2$. One key point is that we show that in many cases of interest that it turns out that reasoning about $U_1 \| U_2$ is undecidable whereas the PMCP is efficiently decidable.

We consider the PMCP for concurrent programs of the form $U_1^{n_1} \| \ldots \| U_m^{n_m}$ comprised of an arbitrary number $n_i$ of copies of a template thread $U_i$ interacting with each other using standard synchronization primitives like pairwise and asynchronous rendezvous, locks, broadcasts, and disjunctive guards. We model threads as Pushdown Systems (PDS) which have emerged as a natural and powerful framework for analyzing recursive programs. Correctness properties are expressed using multi-indexed LTL\X. Note that absence of the "next-time" operator X makes the logic stuttering insensitive which is usual when reasoning about parameterized systems. For ease of exposition, we formulate our results for systems with a single template PDS and for double-indexed LTL\X properties. Extension to systems with multiple templates and k-index properties, where k>2, will be understood to those skilled in the art.

Our new results show that decidability of the PMCP hinges on the set of temporal operators allowed in the correctness property, thereby providing a natural way to characterize fragments of double-indexed LTL for which the PMCP is decidable. We use $L(Op_1, \ldots, Op_k)$, where $Op_i \in \{F, U, G\}$, to denote the fragment comprised of formulae of the form Ef, where f is double-indexed LTL\X formula in positive normal form (PNF), viz., only atomic propositions are negated, built using the temporal operators $Op_1, \ldots, Op_k$ and the Boolean connectives ∨ and ∧. Here F "sometimes", U, "until" and G "always", denote the standard temporal operators and E is the "existential path quantifier". L(U,G) is the full-blown double-indexed LTL\X.

In this disclosure, we delineate precisely the decidability/undecidability boundary of the PMCP for double-indexed LTL\X for each of the standard synchronization primitives. Specifically, we show the following.

(a) The PMCP for L(F,G) and L(U) is, in general, undecidable even for systems wherein the PDSs do not interact at all with each other. The above results imply that to get decidability of the PMCP for PDSs, interacting or not, we have to restrict ourselves to either the sub-logic L(F) or the sub-logic L(G). For these sub-logics, decidability of the PMCP depends on the synchronization primitive used by the PDSs, (b) For the sub-logic L(F), we show that the PMCP is efficiently decidable for PDSs interacting via pairwise or asynchronous rendezvous, disjunctive guards and nested locks but remains undecidable for broadcasts and non-nested locks. The decidability for pairwise rendezvous (and indeed for asynchronous rendezvous and disjunctive guards) is surprising given the undecidability of model checking systems comprised of two PDSs (even when they are isomorphic to each other) interacting via pairwise rendezvous for reachability—a cornerstone undecidability result for model checking interacting PDSs. Our new results show that the PMCP for PDSs interacting via pairwise rendezvous is not only decidable but efficiently so. This is especially interesting as it illustrates that for pairwise (and asynchronous rendezvous and disjunctive guards) switching to the parameterized version of the problem makes it more tractable.

(c) For the fragment L(G), we show that the PMCP is decidable for pairwise and asynchronous rendezvous, disjunctive guards and locks (even non-nested ones). This settles the PMCP for all the standard synchronization primitives.

Let $\{U^n\}$ be the parameterized family of systems defined by the template PDS U interacting via pairwise rendezvous. To get decidability for L(F), we start by formulating a new efficient procedure to compute the set of control states of U which are parameterized reachable, e.g., reachable in $U^n$ for some n. This is accomplished via a fixpoint computation which starts with the set $R_0$ containing the initial state of U, and in the ith iteration constructs the set $R_{i+1}$ of control states that become parameterized reachable assuming that all states in $R_i$ are parameterized reachable. The crucial point is that in adding a new control state c to $R_i$, we have to not only ensure that synchronization constraints arising out of rendezvous are met but also that the newly added states are context-free reachable from existing parameterized reachable states. The checking of the two constraints are dovetailed, i.e., carried out in an interleaved fashion until a fixpoint is reached in that no new states are discovered. We next show, via a flooding argument, that the PMCP for a formula f of L(F) reduces to standard model checking for a system with two non-interacting copies of the PDS $U_R$, where $U_R$ is the template that we get from U by retaining only the parameterized reachable control states of U and converting all pairwise rendezvous between such states to internal transitions. The last problem is known to be efficiently decidable giving us the decidability result. Decidability for PDSs with asynchronous rendezvous and disjunctive guards follows via similar procedures.

To get decidability for L(G), we first show cutoff results. We say that c is a cutoff for formula f if for m≧c, $U^m$|=f if $U^c$|=f. By leveraging the use of Weighted Multi-Automata, we give new procedures to compute cutoffs for L(F) and L(G) formulae for PDSs interacting via pairwise and asynchronous rendezvous. For PDSs interacting via locks, this cutoff is known to be k for k-index properties. The existence of cutoffs reduces the PMCP to model checking systems with finitely many PDSs which we show to be decidable for disjunctive and (non-nested) locks and which is already known to be decidable for PDSs interacting via pairwise and asynchronous rendezvous. For PDSs interacting via disjunctive guards, we show, via a flooding argument, that the PMCP for a formula f of L(G) reduces to standard model checking for a system with two (non-interacting) copies of a simplified PDS $U_R$. The last problem is known to be efficiently decidable giving us the decidability result.

A system and method for computing dataflow in concurrent programs of a computer system, includes, given a family of threads $(U^1, \ldots, U^m)$ and a Linear Temporal Logic (LTL) property, f, for a concurrent program, computing a cutoff for the LTL property, f, where c is called the cutoff if for all n greater than or equal to c, $U^n$ satisfies f if $U^c$ satisfies f. The cutoff is computed using weighted multi-automata for internal transitions of the threads. Model checking a cutoff number of processes is performed to verify race freedom in the concurrent program.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 1 is a block/flow diagram showing a system/method for solving a dataflow computation in concurrent programs in accordance with an illustrative embodiment;

DETAILED DESCRIPTION OF PREFERRED EMBODIMENTS

Figure 2:
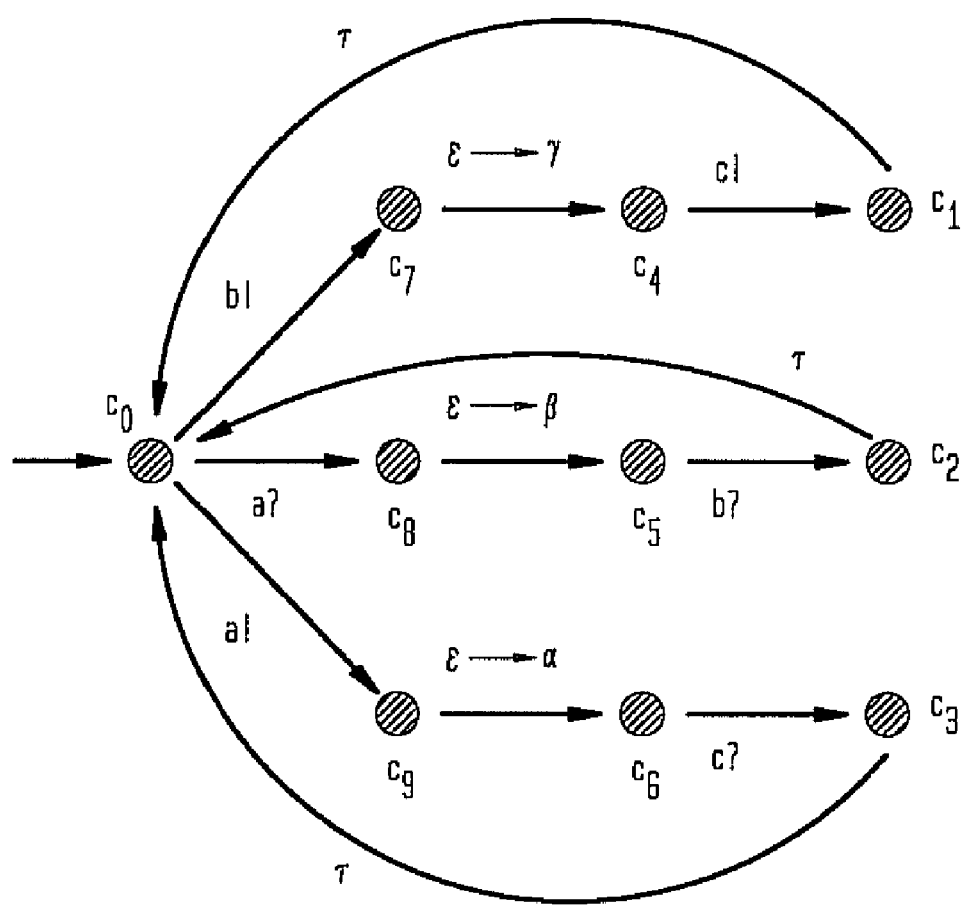
FIG. 2 is a diagram showing a template process U with control states c and transition designations with ! and ? for demonstrating operation in accordance with the present principles.

The present embodiments relate to computer system verification and more particularly to verification of concurrent programs, such as, e.g., device drivers used for controlling hardware components like disk drives, audio speakers, etc. In particularly useful embodiments, parameterized qualities of computer systems are exploited in that the concurrent programs are comprised of many copies of the same hardware or software component. In addition, the present embodiments are applicable to other applications, such as, e.g., embedded software used in mobile devices like cell phones, personal digital assistants (PDAs), database software, SQL servers, application level software, like web browsers (Firefox™, Explorer™) or any application using concurrency.

Model checking of interacting pushdown systems is a core problem underlying dataflow analysis for concurrent programs. However, it is decidable only for very restricted temporal logic fragments. The fundamental obstacle is the undecidability of checking non-emptiness of an intersection of two context-free languages. It is not difficult to couple two different pushdown systems (PDSs) either by making the synchronization primitive expressive enough or the property being model-checked strong enough to accept precisely the intersection of the context free languages accepted by these PDSs. This results in the undecidability of the model checking problem. However, in accordance with the present principles, that many important classes of concurrent systems are parameterized is exploited, i.e., the classes are comprised of many replicated copies of a few basic type of components.

In accordance with the present principles, the general difficult problem need not be solved. We exploit the fact that many concurrent systems are parameterized, i.e., composed of many replicated copies of the same basic component. Indeed for most distributed protocols for networking, cache coherence, synchronization the same exact piece of code implementing the protocol is run on different machines thus making it parameterized. The Internet can be thought of as a network of computers, each running the TCP/IP protocol. Other examples include multi-core-architectures with multi-threading. Indeed, a device driver is supposed to run correctly irrespective of the number of threads executing it.

A new and efficient inter-procedural dataflow analysis system and method are provided for parameterized multi-threaded programs. The problem reduces to the problem of model checking interacting PDSs wherein all the PDSs are copies of each other. The prior work so far on analyzing parameterized programs has been restricted to models where there is no effective communication between the threads (PDSs) and is thus of little practical value. In the present disclosure, we have considered more powerful and realistic models wherein PDSs can interact via locks, rendezvous (e.g., WaitNotify( ) from Java™) or broadcasts (e.g., Wait NotifyAll( ) from Java™). Thus, inter-procedural analysis is extended to the parameterized concurrent domain for realistic models of communication.

We consider the model checking problem for concurrent programs comprised of a finite, but arbitrarily many, copies of a fixed set of threads—often referred to as the Parameterized Model Checking Problem (PMCP). Modeling each thread as a PDS, we delineate the decidability boundary of the PMCP for Indexed Linear Temporal Logic (LTL) for each of the standard synchronization primitives. Our results lead to the surprising conclusion that in many cases of interest, the PMCP, even though a seemingly harder problem, is more tractable than the problem of model checking a fixed number of PDSs. For example, for PDSs interacting via pairwise rendezvous, the PMCP for reachability (presence of a data race) is efficiently decidable whereas model checking a system with two such (even isomorphic) PDSs is undecidable. Deciding the PMCP efficiently is of great importance for parameterized applications like, for instance, Linux™ device drivers. However, the broader practical implication of our results is that even if we are not interested in parameterized reasoning but only in model checking a system $U_1\|\ldots\|U_m$ with a fixed number of possibly distinct threads $U_1, \ldots, U_m$, then in many cases it is more useful to consider the PMCP for the corresponding parameterized system $U_1^{n_1}\|\ldots\|U_m^{n_m}$ with arbitrarily many copies of $U_1, \ldots, U_m$.

Practical applications in accordance with the present principles include that for debugging concurrent multithreaded software, it is more tractable to consider the parameterized version of the problem. For example, it we want to detect data races in a concurrent program T1||T2 with two Linux™ device drivers T1 and T2 then it is more efficient and tractable to consider the same problem for a system $T_1^n\|T_2^m$ with an arbitrary number of copies of T1 and T2. This is surprising since it is seemingly a harder problem but in reality is much more tractable.

It should be understood that the elements shown in the FIGS. may be implemented in various forms of hardware, software or combinations thereof. Preferably, these elements may be stored on computer media and are implemented in software, on one or more appropriately programmed general-purpose digital computers having a processor and memory and input/output interfaces. Software may include but is not limited to firmware, resident software, microcode, etc.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Embodiments can take the form of a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be an electronic, magnetic, optical, electromagnetic, infrared, or semiconductor system (or apparatus or device) or a propagation medium. For example, the medium may include a computer-readable medium such as a semiconductor or solid state memory, magnetic tape, a removable computer diskette, a random access memory (RAM), a read-only memory (ROM), a rigid magnetic disk and an optical disk, etc.

Referring now to the drawings in which like numerals represent the same or similar elements and initially to FIG. 1, a block/flow diagram showing system/method for verifying concurrent programs is illustratively depicted. Consider a family of systems of the form $U_1^{n_1}\|\ldots\|U_m^{n_m}$ comprised of an arbitrary number $n_i$ of copies of a template thread $U_i$. Each template $U_i$ may be modeled as a Pushdown System (PDS). A PDS has a finite control part and a stack which models recursion. Formally, a PDS is a five-tuple $P=(P,Act,\Gamma,c_0,\Delta)$, where P is a finite set of control states, Act is a finite set of actions containing the empty action e, $\Gamma$ is a finite stack alphabet, and $\Delta \subset (P\times\Gamma)\times Act\times(P\times\Gamma^*)$ is a finite set of transition rules. If $((\bar{p,\gamma}), a, (p', w)) \in \Delta$ then we write $(p, \gamma) \overset{a}{\hookrightarrow} (p', w)$. A configuration of P is a pair (p, w), where $p \in P$ denotes the control location and $w \in \Gamma^*$ the stack content. We call $c_0$ the initial configuration of P. The set of all configurations of P is denoted by C. For each action a, we define a relation $\overset{a}{\hookrightarrow} \subset C\times C$ as follows: if $(q, \gamma) \overset{a}{\hookrightarrow} (q', w)$, then $(p, \gamma v) \overset{a}{\hookrightarrow} (p', wv)$ for every $v \in \Gamma^*$.

We use $\{U_1, \ldots, U_m\}$ to denote the family of concurrent programs (or threads), $U_1^{n_1}\|\ldots\|U_m^{n_m}$, formed by the interleaved parallel composition of $n_i$ copies of template $U_i$. The jth copy of $U_i$, denoted by $U_j[i]$, communicates with the other threads via the standard synchronization primitives—locks, pairwise or asynchronous rendezvous, broadcasts and disjunctive boolean guards. Pairwise rendezvous are inspired by calculus of communicating systems (CCS) (e.g., a language for writing concurrent programs) whereas asynchronous rendezvous and broadcasts are used to model the Wait/Notify and Wait/NotifyAll primitives of Java™. The semantics of $U_1^{n_1}\|\ldots\|U_m^{n_m}$ is defined in the usual way and is therefore omitted. For the sake of simplicity, we formulate our results for parameterized systems with a single template and for double-index properties. Given a global computation x of $U^n$, we use x[i,j] to denote the sequence resulting by projecting x onto the local computation sequence of threads U[i] and U[j].

Correctness Properties. Given template U, we consider double-index properties of the form $\Lambda_{i,j} Eg(i,j)$, where g(i,j) is an LTL\X property interpreted over the local control states of copies U[i] and U[j]. Note that due to symmetry $U^n \models \Lambda_{i,j} Eg(i,j)$ if $U^n \models Eg(1,2)$. We thus restrict ourselves to properties of the form $Eg(1,2)$. For this logic, we follow the classification $L(Op_1, \ldots, Op_k)$ based on the temporal operators allowed in the correctness property as previously formulated. We observe that double-index LTL\X is a very rich logic which can encode many properties of interest. For instance, the presence of a data race can be formulated as the double-index formula $EF(c_1 \wedge d_2)$.

Given the family of PDSs, for a concurrent program comprised of many similar components, e.g., device drivers which run hardware like disk drives, audio speakers, etc., and an logic temporal property f (as described above), compute a cutoff for f in block 12. c is called a cutoff if for all $n \geq c$, $U^n$ satisfies f, if $U^c$ satisfies f. This reduces the problem to debugging a system with up to a cutoff number of processes.

In block 14, to compute these cutoffs, employ weighted multi-automata. Computation of these cutoffs reduces to pre*-closure computations of weighted automata which can be carried out efficiently in polynomial time in the size of source code. Once cutoffs have been computed, model check the resulting systems of cutoff size in block 16. The techniques used depend on the communication primitives used by the threads and the techniques may be known.

The present embodiments extend inter-procedural dataflow analysis to the parameterized concurrent domain for realistic models of communication among threads. All the standard Java™ communication primitives may be modeled. The present embodiments are more scalable, i.e., can potentially verify larger programs than existing techniques, and accomplish this by avoiding construction of the global state space of the given program thus bypassing the state explosion problem. The analysis is reduced from a concurrent multi-threaded program to its individual threads.

The methods are both sound and complete, thus avoiding bogus error traces that could be generated by less precise techniques. This is important from a commercial standpoint as most of the resources spent in real life verification go into detecting/avoiding bogus error traces.

Undecidability Barriers: We start by showing two undecidability results for the PMCP for systems comprised of PDSs that do not even interact with each other.

The decidability of the PMCP hinges on the set of temporal operators allowed in the correctness property, thereby providing a natural way to characterize fragments of double-indexed LTL for which the PMCP is decidable. In one example, we use $L(Op_1, \ldots, Op_k)$, where $Op_i \in \{F,U,G\}$, to denote the fragment comprised of formulae of the form Ef, where f is double-indexed LTL\X formula in positive normal form (PNF), viz., only atomic propositions are negated, built using the temporal operators $Op_1, \ldots, Op_k$ and the Boolean connectives $\vee$ and $\wedge$. Here F "sometimes", U, "until" and G "always", denote the standard temporal operators and E is the "existential path quantifier". L(U,G) is the full-blown double-indexed LTL\X.

The PMCPs for L(U) and L(G,F) are undecidable for systems comprised of non-interacting PDSs. An important consequence of this is that for more expressive systems wherein PDSs interact using some synchronization mechanism, we need to focus only on the remaining fragments, e.g., L(F) and L(G).

Pairwise and Asynchronous Rendezvous: Let {U} be the parameterized family defined by a template process U modeled as a PDS synchronizing via pairwise rendezvous. Here, $\Sigma$, the set of action symbols of U, is comprised of the set $\Sigma_{in}$ of internal transition labels; and the sets $\Sigma_{pr} \times \{!\}$ and $\Sigma_{pr} \times \{?\}$ of send and receive pairwise rendezvous transitions, respectively. We assume that synchronizing transitions, i.e., those labeled by actions in $\Sigma_{pr} \times \{!\} \cup \Sigma_{pr} \times \{?\}$, do not modify the stack of the PDS executing the transition. For action $l \in \Sigma_{pr}$, a pair of transitions labeled with l! and l? are called matching. We recall that for $r \in \Sigma_{pr} \times \{!\} \cup \Sigma_{pr} \times \{?\}$, transition $tr_1:a \xrightarrow{r} b$ of a process U[i] of $U^n$ is enabled in global state s, if there exists a process U[j] of $U^n$, where $j \neq i$, in local state c such that there exists a matching transition of the form $tr_2:c \xrightarrow{\bar{r}} d$ in $\Delta$. To execute the rendezvous, both the pairwise send and receive transitions $tr_1$ and $tr_2$ must be fired synchronously in one atomic step.

We present decision procedures for the PMCP for L(F) and L(G) for PDSs interacting via pairwise and asynchronous rendezvous. We start by presenting a provably efficient procedure for computing the set of all parameterized reachable control locations of U. This is needed for not only formulating the procedures for L(F) and L(G) but is also of independent interest as detecting the presence of data races can be reduced to deciding parameterized reachability.

Parameterized Reachability: We say that a control state c (configuration c) of template process U is parameterized reachable if there exists a reachable global state s of $U^n$, for some n, with a process in control state c (configuration c).

It can be shown that if a configuration c of U is parameterized reachable; then given l, for some k, there exists a reachable global state s of $U^k$ with at least l copies of c. In other words, we can pump up the multiplicity of each parameterized reachable configuration of U to any arbitrarily large value. This relieves us of the burden of tracking the multiplicity of each configuration of U.

Unbounded Multiplicity: Let R be the set of all parameterized reachable configurations of U and let R' be a finite subset of R. Then given l, for some m, there exists a finite computation of $U^m$ leading to a global state s with at least l copies of each configuration in R'.

The above result reduces the PMCP for $EF(c_1 \wedge \ldots \wedge c_k)$, i.e., the presence of a data race, to the PMCP for EFc, where c is a control state of U. We have: $\exists n, U^n \models EF(c_1 \wedge \ldots \wedge c_k)$ if for each $i \in [1 \ldots k]$, $c_i$ is parameterized reachable.

While computing parameterized reachable control states for the case where U is a finite state labeled transition system can be accomplished via a simple fixpoint computation, for PDSs it is complicated by the requirement to simultaneously satisfy constraints arising both out of synchronization primitives and context-free reachability introduced by the stack.

Referring to FIG. 2, an example template process is shown for determining reachability. Consider the template process U. Suppose that we want to decide whether for some n, $U^n \models EF_{c_1}$. We start with the set $R_0 = \{c_0\}$ containing only the initial state $c_0$ of U. We then construct a series of sets $R_0, \ldots, R_m$, where $R_{i+1}$ is obtained from $R_i$ by adding new control states that become parameterized reachable assuming that all states in $R_i$ are parameterized reachable. In constructing $R_{i+1}$ from $R_i$ we need to make sure that both the constraints, i.e., those imposed by (i) the synchronization primitives, and (ii) context-free reachability are satisfied. We accomplish this in a dovetailed fashion.

First, to satisfy the synchronization constraints, we convert all transitions of the form $a \xrightarrow{p} b$ such that there exists a transition of the form $c \xrightarrow{p'} d$, where p and p' are matching send and receive rendezvous actions with $c \in R_i$, to an internal transition of the form $a \xrightarrow{\tau} b$, where $\tau$ is a newly introduced special internal action symbol in $\Sigma_{in}$. This is motivated by the fact that since c is parameterized reachable, we can ensure that if a becomes parameterized reachable (now or in some future iteration), then, for some m, there exists a reachable global state of $U^m$ with a process each in local states a and c.

In other words, if a becomes reachable, the rendezvous transition $a \xrightarrow{p} b$ can always be enabled and executed. Thus, it can be treated like an internal transition. In this way, by flooding all the control states of $R_i$, we can remove all the synchronization constraints arising out of pairwise send or receive transitions emanating from control states in $R_i$. This will enable every rendezvous transition with a matching send/receive starting at a control state in $R_i$. Such transitions can therefore be replaced by internal transitions. Motivated by this, we define $U_{i+1}$ to be the template that we get from the original template U by replacing the appropriate pairwise rendezvous send/receive transitions as described above with internal transitions and removing the remaining rendezvous send and receive transitions.

To check that the second constraint, i.e., context-free reachability, is satisfied, we can now use any procedure for model checking a single PDS, to determine the set $R_c^i$ of those control states of U that are reachable in the individual PDS $U_i$. This gives us the set $R_c^i$ of all the context free reachable states in $U_i$. If new control states become reachable via removal of some synchronization constraints in the previous set, they are added to $R_{i+1}$; otherwise, we have reached a fixpoint and the procedure terminates.

Figure 3:
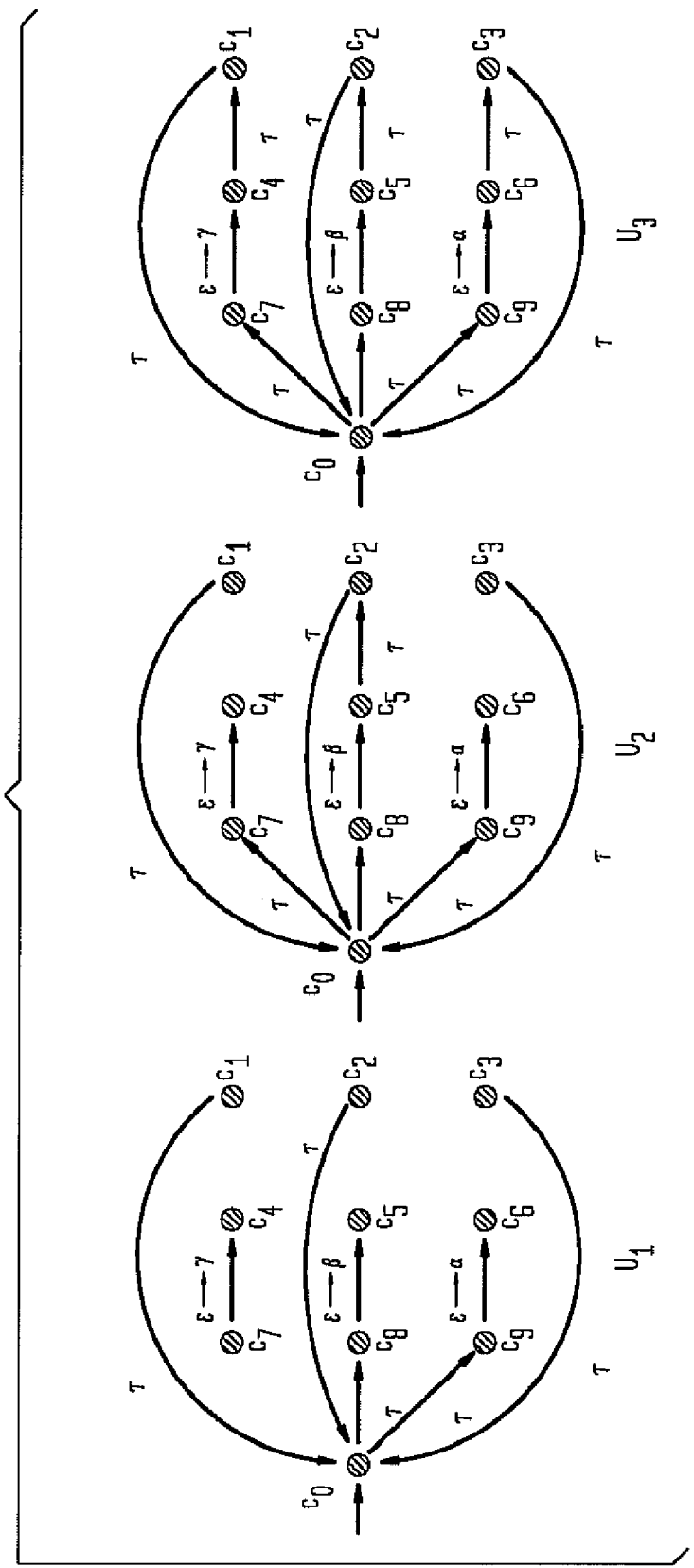
FIG. 3 is a diagram showing a fixpoint computation in accordance with the present principles showing progression through several iterations.

Referring to FIG. 3, in the example, $R_0$ is initialized to $\{c_0\}$. This enables both the transitions $c_0 \xrightarrow{a?} c_9$ and $c_0 \xrightarrow{a?} c_8$ and hence both of them can be converted to internal transitions resulting in the template $U_1$. In a second iteration ($U_2$), we note that $c_5$, $c_6$, $c_8$ and $c_9$ are all reachable control states of template $U_1$ and so $R_1 = \{c_0, c_5, c_6, c_8, c_9\}$. Now, since both $c_0$ and $c_5$ are in $R_1$, the rendezvous transitions $c_5 \xrightarrow{b!} c_2$ and $c_0 \xrightarrow{b!} c_7$ become enabled and can be converted to internal transitions resulting in the template $U_2$, In $U_2$, control states $c_2$, $c_4$ and $c_7$ now become reachable and are therefore added to $R_2$ resulting in $R_3 = \{c_0, c_2, c_4, c_5, c_6, c_7, c_8, c_9\}$. Finally, since both the control states $c_4$ and $c_6 \in R_3$, the rendezvous transitions $c_6 \xrightarrow{e?} c_3$ and $c_4 \xrightarrow{e!} c_1$ are converted to internal transitions resulting in the template $U_3$. Since $c_1$ and $c_3$ are reachable control locations of $U_3$, these control locations are now included in $R_4$ thereby reaching a fixpoint and leading to termination of the procedure. Since $c_1 \in R_4$, we conclude that $c_1$ is parameterized reachable. A formal description of a method A is given below. The method A returns the set of parameterized reachable control states of U.

METHOD A: Initialize i=0 and $R_0 = \{c_0\}$, where $c_0$ is the initial state of U. Next, i=i+1. Construct PDS $U_i$ by replacing each pairwise send (receive) transition of template U of the form $a \xrightarrow{p} b$, such that there exists a matching receive (send) transition of the form $c \xrightarrow{p} d$ where $c \in R_{i-1}$, by the internal transition $a \xrightarrow{r} b$ and removing the remaining pairwise send or receive rendezvous transitions. Compute the set $R_c^i$ of context-free reachable control locations of $U_i$ using a procedure for model checking a single PDS. Set $R_i = R_{i-1} \cup R_c^i$. Except for the initialization step, perform these steps until $R_i \not\subset R_{i-1}$. Return $R_i$.

Complexity Analysis: We start by noting that in each iteration of the method A, we add at least one new control state to $R_i$. Thus, the method terminates in at most $|Q|$ times, where Q is the set of control states of U. During the ith iteration we need to decide for each control state in Q, $R_i$ whether it is context-free reachable in $U_{i+1}$ which, by using a model checking procedure for PDSs, can be accomplished in $O(|U|^3)$ time, where $|U|$ is the size of U. Each step therefore takes at most $O(|U|^4)$ time. Thus, the entire method runs in $O(|U|^5)$. The Parameterized Model Checking Problem for control state reachability, and hence $EF(c_1 \wedge \ldots \wedge c_k)$ (data race), for systems composed from a template PDS U interacting via pairwise rendezvous can decided in $O(|U|^5)$ time, where $|U|$ is the size of U.

Asynchronous Rendezvous: The procedure for deciding the PMCP for PDSs interacting via asynchronous rendezvous, which are more expressive than pairwise rendezvous, is essentially the same as the method A. A minor modification is needed to account for the slightly different semantics of an asynchronous rendezvous. The only difference is that an asynchronous send transition $a \xrightarrow{n} b$ can be executed irrespective of whether a matching receive $c \xrightarrow{n} d$ is present or not. A receive transition, on the other hand, does require a matching send to be currently enabled with both the send and receive transitions then being fired atomically. Now, constructing PDS $U_i$, in method A is modified as follows: We replace each asynchronous send transition of template U of the form $a \xrightarrow{n} b$, with the internal transition $a \xrightarrow{r} b$. On the other hand, to replace a receive transition of the form $a \xrightarrow{n} b$ with the internal transition $a \xrightarrow{r} b$, we need to test whether there exists a matching send transition of the form $c \xrightarrow{n} d$ with $c \in R_{i-1}$. The remaining receive asynchronous rendezvous transitions are removed. The time complexity of the method remains the same.

Extension to Multiple Templates: To start with, $R_0$ contains the initial control state of each of the templates $U_1, \ldots, U_m$. The set $R_i$ now tracks the union of parameterized reachable control states detected up to the ith iteration in any of the templates. Finally, in method A, for each $1 \leq j \leq m$ we construct PDS $U_{ji}$ by replacing each rendezvous send/receive transition $a \xrightarrow{p} b$ in template $U_j$ having an enabled matching receive/send transitions of the form $c \xrightarrow{p} d$ in any of the templates, where $c \in R_{i-1}$, with the internal transition $a \xrightarrow{r} b$.

Model Checking Procedure for L(F): From the given template $U = (P, Act, \Gamma, c_0, \Delta)$, we define the new template $R = (P_R, Act, \Gamma, c_0, \Delta_R)$, where $P_R$ is the set of parameterized reachable control states of U and $\Delta_R$ is the set of transitions of U between states of $P_R$ with each pairwise rendezvous send or receive transition converted to an internal transition. Let f be a formula of the form Eg(1,2), where g(1,2) is a double-indexed LTL\X formula with atomic propositions over U[1] and U[2]. Then, if we restrict reasoning about f to finite computation paths then for some n, $U^n \models E_{fin} g$ if $U_R^2 \models E_{fin} g$, where $E_{fin}$ quantifies only over finite paths.

The intuition behind the reduction of the PMCP to a 2-process instance is a flooding argument resulting from the unbounded multiplicity result. If f has a finite computation x of length l, say, as a model, then at most l pairwise send or receive transitions are fired along x. By the unbounded multiplicity lemma, for some m, there exists a computation y leading to a reachable state of $U^m$, for some m, with at least l copies of each control state of $U_R$. In a system with $U^{m+2}$ processes, we first let processes $U_3, \ldots, U_{m+2}$ execute y to flood all control states of $U_R$ with multiplicity at least l. Then, we are guaranteed that in any computation x of U[1,2] of length not more than l, the rendezvous transition can always be fired via synchronization with one of the processes $U_3, \ldots, U_{m+1}$ and can therefore be treated as internal transitions.

Thus we have: (Binary Reduction Result). For any finite computation x of $U^n$, where $n \geq 2$, there exists a finite computation y of $U_R^2$ such that y is stuttering equivalent to x[1,2]. As an immediate corollary, it follows that if f has a model which is a finite computation of $U^m$, for some m, then for some k, $U^k \models f$ if $U_R^2 \models f$. In particular:

Corollary For any formula f of L(F), for some in m, $U^m \models f$ if $U_R^2 \models f$.

Note that the above result reduces the PMCP for L(F) for PDSs interacting via pairwise or asynchronous rendezvous to (standard) model checking of systems comprised of only two non-interacting PDSs which is known to be efficiently decidable. As a corollary, we have that the PMCP for L(F) is decidable in polynomial time in the size of U.

Computing Cutoffs: We say that cut is a cutoff for a temporal logic formula f and a parameterized family defined by a template U if for m≧cut, $U^m \models f$ if $U^{cut} \models f$. The existence of a cutoff for a formula f is useful as it reduces the PMCP for f to a finite number of standard model checking problems for systems with up to the cutoff number of copies of U. Let B(F) be the set of branching time formulae built using the temporal operator AF, the boolean operators ∨ and ∧, and atomic propositions. We show how to compute cutoffs for L(F) formulae and then extend this to handle B(F) formulae. One motivation for computing cutoffs is that it is a step in the decision procedure for the PMCP for L(G) formulae. One can, of course, use the cutoff approach to model check L(F) formulae also.

Cutoffs for L(F) formulae: We start by observing that the cutoff cut for a formula f of L(F) is related to the number of rendezvous transitions fired along finite computations satisfying f. Let x be a finite computation of $U^n$, for some n, satisfying f. For each rendezvous transition tr of U, let $n_{tr}$ be the number of times tr is fired along x[1,2]. We assume, and without loss of generality, that each rendezvous send/receive transition tr has a unique matching receive/send transition, denoted by $\overline{tr}$, in U. For each control state c, let $Tr_c$ be the set of pairwise rendezvous send or receive transitions tr of the form c→d such that $\overline{tr}$ is fired along x[1,2]. Also, for each control state c of U, let $n_c = \Sigma_{tr \in Tr_c} n_{\overline{tr}}$. Then, one can give a cutoff for f in terms of the values of $n_c$.

As a first step towards that direction, we show that if cut is such that there exists a reachable global state of $U^{cut}$ with at least $n_c$ copies of each control state c, then using a flooding argument we have: cut'+2 is a cutoff for f. Next, we estimate an upper bound for cut from $n_c$. We denote by $i_c$, the first iteration for the method A in which control state c of U was first added to $R_i$. Then, we have: $U^m \models EF_c$ where $m=2^{i_c}$. For each control state c of U let $N_c$ be a cutoff for EFc. Then cut≦$\Sigma_{c \in R} n_c N_c$.

The problem of computing cut, thus reduces to computing bounds for $n_{tr}$ and $N_c$. We start with $n_{tr}$, the number of pairwise rendezvous transitions fired along a computation of $U^m$, for some m, satisfying the given L(F) formula. We first consider the case where an L(F) formula is single-index, i.e., atomic propositions are interpreted only over one process. For this, we assume, without loss of generality, that each control state of U is parameterized reachable else we simply remove unreachable states and the associated transitions. Furthermore, using the same flooding argument, we have that each control states of U can be flooded with arbitrary multiplicity. Thus, when reasoning about finite computations, we can treat each rendezvous transition as an internal transition. This eases analysis as instead of reasoning about the parameterized family {U}, it suffices to reason only about the single template U.

Computation of these bounds for PDSs is complicated by context-free reachability introduced by the stack. To handle that we leverage the notion of a Weighted Multi-Automaton (WMA) which is a Multi-Automaton (MA) with each of its transitions labeled with a non-negative integer. WMAs have been used before for dataflow analysis. However, they are employed here for a different purpose, e.g., for estimating a bound on the number of pairwise rendezvous transition fired in transiting between two control states. Intuitively, the weight labeling a transition s→t of a WMA indicates an upper bound on the number of rendezvous transitions that need be fired in order to get from s to t.

A Weighted Multi-Automaton (WMA) may be defined as follows. Given a PDS P=(P,Γ,$c_0$,Δ), a weighted multi-automaton is a tuple M=(Γ,Q,δ,w,I,F), where M'=(Γ,Q,δ,I,F) is a multi-automaton and w:δ→Z is a function mapping each transition of M to a non-negative integer. The weight of a finite path x of M is defined to be the sum of the weights of all the transitions appearing along x. Given states s and t of M, we use $$s \xrightarrow{u:b} t$$

to denote the fact that there is a path in M from s to t labeled with it and having weight b. To estimate a bound for the number of rendezvous transitions fired along a computation satisfying f, we proceed by constructing a WMA $M_f$ for f which captures the (regular) set of all configurations of U which satisfy f. Then, if b is the weight of an accepting path for ($c_0$, ⊥) in $M_f$, we show that there exists a path of U along which at most b pairwise rendezvous transitions are fired.

Since an L(F) formula is built using the operators F, ∨ and ∧, in order to construct $M_f$ it suffices to show how to construct WMAs for Fg, g ∧ h and g ∨ h, given WMAs for g and h. Then, given an L(F) formula f, repeated applications of these constructions inside out starting with the WMAs for the atomic propositions of f gives us $M_f$.

DEFINITIONS multi-Automata: Let P=(P,Act,Γ,$c_0$,Δ) be a pushdown system where P={$p_1$, ..., $p_m$}. A P-multi-automaton (P-MA for short) is a tuple A=(Γ,Q,δ,I,F) where Q is a finite set of states, δ ⊂ Q×Γ×Q is a set of transitions, I={$s_1$, ..., $s_m$} ⊂ Q is a set of initial states and F ⊂ Q is a set of final states. Each initial state $s_i$ corresponds to the control state $p_i$ of P.

We define the transition relation →⊂Q×Γ*×Q as the smallest relation satisfying the following:

if (q,γ,q')∈δ then q $\xrightarrow{r}$ q', q $\xrightarrow{\epsilon}$ q for every q∈Q, and if q $\xrightarrow{u}$ q" and q" $\xrightarrow{v}$ q' then q $\xrightarrow{w}$ q'.

A multi-automaton can be thought of as a data structure that is used to succinctly represent (potentially infinite) regular sets of configurations of a given PDS. Towards that end, we say that multi-automaton A accepts a configuration ($p_i$,w) if $s_1 \xrightarrow{w}$ q for some q∈F. The set of configurations recognized by A is denoted by Conf(A). A set of configurations is regular if it is recognized by some MA.

Alternating Pushdown Systems: Let P=(P,Act,Γ,$c_0$,Δ) be a pushdown system. An APDS is a five-tuple P=(P,Γ,Δ), where P is a finite set of control locations, Γ is a finite stack alphabet, and Δ ⊂ (P×Γ)×$2^{(P \times \Gamma^*)}$ is a finite set of transition rules. For (p,γ,S)∈Δ, each successor set is of the form {($p_1$,$w_1$), ..., ($p_n$,$w_n$)}∈S denotes a transition of P and is denoted by (p,γ) {($p_1$,$w_1$), ..., ($p_n$,$w_n$)}. Due to non-determinism there may be multiple successor sets for each pair of control state p and stack alphabet γ all of which are captured by the set S. A configuration of P is a pair (p,w), where p∈P denotes the control location and w∈Γ* the stack content. The set of all configurations of P is denoted by C. If (p,γ){($p_1$,$w_1$), ..., ($p_n$,$w_n$)}, then for every w∈Γ* the configuration (p,γw) is an immediate predecessor of the set ($p_1$,$w_1$w, ..., $p_n$,$w_n$w), this set being called the immediate successor of (p,γw). We use → to denote the immediate successor relation, Note that firing the transition $(p,\gamma)\{(p_1,w_1), \ldots, (p_n,w_n)\}$, from configuration $(p,\gamma w)$ causes the APDS to branch into the configurations $(p_1,w_1w, \ldots, p_n,w_nw)$.

A run of P for an initial configuration c is a tree of configurations with root c, such that the children of a node c' are the configurations that belong to one of its immediate successors. We define the reachability relation $\Rightarrow \subset (P \times \Gamma^*) \times 2^{P \times \Gamma^*}$ between configurations and sets of configurations. Informally $c \Rightarrow C$ if and only if C is a finite frontier of a run of P starting from c. Formally, $\Rightarrow$ is the smallest subset of $(P \times \Gamma^*) \times 2^{P \times \Gamma^*}$ such that $c \Rightarrow \{c\}$ for every $c \in P \times \Gamma^*$ if c is an immediate predecessor of C, then $c \Rightarrow C$, if $c \Rightarrow \{c_1, \ldots, c_n\}$ and $c_i \Rightarrow C_i$ for each $1 \leq i \leq n$, then $c \Rightarrow (C_1 \cup \ldots \cup C_n)$.

Alternating Multi-Automata: Let $P=(P,\Gamma,\Delta)$ be an APDS system where $P=\{p_1, \ldots, p_m\}$. An alternating P-multi-automaton (P-AMA for short) is a tuple $A=(\Gamma,Q,\delta,I,F)$ where Q is a finite set of states, $\delta \subset Q \times \Gamma \times 2^Q$ is a set of transitions, $I=\{s_1, \ldots, s_m\} \subset Q$ is a set of initial states and $F \subset Q$ is a set of final states. We define the transition relation $\rightarrow \subset Q \times \Gamma^* \times 2^Q$ as the smallest relation satisfying the following:

if $(q,\gamma,Q') \in \delta$ then $q \xrightarrow{\gamma} Q'$, $q \xrightarrow{\epsilon} \{q\}$ for every $q \in Q$, and if $\xrightarrow{\gamma} \{q_1, \ldots, q_{11}\}$ and for each $1 \leq i \leq n$ $q_1 \xrightarrow{w} Q_1$ then $\xrightarrow{w} (Q_1 \cup \ldots \cup Q_{11})$.

AMA A accepts a configuration $(p_i,w)$ if $s_i \xrightarrow{w} Q$ for some $Q \subset F$. The set of configurations recognized by A is denoted by Conf(A). Given a finite sequence $w \in \Gamma^*$ and a state $q \in Q$, a run of A over w starting from q is a finite tree whose nodes are labeled by states in Q and whose edges are labeled by symbols in $\Gamma$ such that the root is labeled by q and the labeling of the other nodes is consistent with $\delta$. Observe that in such a tree each sequence of edges going from the root to the leaves is labeled with w. A set of configurations is regular if it is recognized by some AMA.

Weighted Automaton for $\vee$. Let $M_1=(\Gamma,Q_1,\delta_1,w_1,I_1,F_1)$ and $M_2=(\Gamma,Q_2,\delta_2,w_2,I_2,F_2)$ be two WMAs. Then, we can construct a WMA M accepting the union of configurations accepted by $M_1$ and $M_2$ by first renaming each initial state s of $M_1$ as s' and each initial state s of $M_2$ as s". Then we define a Multi-Automaton $M=M_1 \vee M_2$ via the standard union construction $M=(\Gamma,Q_1 \cup Q_2,\delta_1 \cup \delta_2 \cup \delta_{12},w,I,F_1 \cup F_2)$, where for transition tr$\in R_i$, $\delta(tr)=\delta_1(tr)$, $\delta(q_0 \xrightarrow{\prime} q_1)=0$ and $\delta(q_0 \xrightarrow{\prime} q_2)=0$; I is the set of newly introduced initial states $s_1, \ldots, s_m$ corresponding to control states $p_1, \ldots, p_m$ of the template U and $\delta_{12}$ is the set of zero weight transitions $\cup_1 \{S_1 \xrightarrow{\prime} s'_i$ and $s_1 \xrightarrow{\prime} s''_i\}$.

Weighted Automaton for $\wedge$. Let $M_1=(\Gamma,Q_1,\delta_1,w_1,I_1,F_1)$ and $M_2=(\Gamma,Q_2,\delta_2,w_2,I_2,F_2)$ be two WMAs. Then, we can construct a WMA M accepting the intersection of $M_1$ and $M_2$ via the standard product construction $M=(\Gamma,Q_1 \times Q_2,\delta,w,I_1 \times I_2,F_1 \times F_2)$, where $(s_1, s_2) \xrightarrow{t,w} (s_3, s_4) \in \delta$ if $(s_1 \xrightarrow{t,w_1} s_3)$ and $(s_2 \xrightarrow{t,w_2} s_4)$ and w is the maximum of $w_1$ and $w_2$. The state $(s_i,s_i)$ is renamed as $s_i$ in order to ensure that for each control state $p_i$ of U there is an initial state of M.

Weighted Multi-Automaton for Fg: Let $M_0$ be a given WMA accepting the set of regular configurations of U satisfying g. Starting at $M_0$, we construct a series of WMAs $M_0, \ldots, M_m$ resulting in the WMA $M_m$. We recall from the definition of an MA that for each control state $p_i$ of U there is an initial state $s_i$ of $M_0$. We denote by $\rightarrow_k$ the transition relation of $M_k$. Then, for every $k \geq 0$, $M_{k+1}$ is obtained from $M_k$ by conserving the set of states and adding new transitions as follows: (i) For each internal transition $p_i \rightarrow p_j$, we add the transition $s_i \xrightarrow{\epsilon,0} s_j$ with weight 0. (ii) For each pairwise rendezvous send or receive transition $p_i \rightarrow p_j$, we add the transition $s_i \xrightarrow{\epsilon,1} s_j$ with weight 1. (iii) For each stack transition $p_i \xrightarrow{\gamma u} p_j$ of U, if there exists a path x in $M_k$ from state $s_j$ to t labeled with u, we add the transition $s_i \xrightarrow{\gamma,w_u} t$, where $w_u$ is the sum of the weights of the transitions occurring along x. Note that if there exists more than one such path we may take $w_u$ to be the minimum weight over all such paths.

For configurations s and t of U, let $s \Rightarrow_{\leq b} t$ denote the fact that there is a path from s to t along which at most b pairwise rendezvous transitions are fired. Then, we have: If $s_j \xrightarrow{w,b} {}_1 q$, then $(p_j,w) \Rightarrow_{\leq b} (p_k,v)$ for some $p_k$ and v such that $s_k \xrightarrow{v,b_2} {}_0 q$, where $b=b_1+b_2$. Moreover if q is the initial state s, then $p_k=p_i$ and $v=\epsilon$. The constructions of WMAs for $f \vee g$ and $f \wedge g$ are similar to the standard union and intersection construction for automata.

Given an L(F) formula f, we first construct a WMA for each atomic proposition of f by constructing an MA for the atomic proposition and setting the weights of all its transitions to 0. Next, we perform the above operations by traversing the formula f inside out starting from the atomic propositions. Let $M_f$ be the resulting WMA. Using the above result, we let configuration (q,u) of U be accepted by $M_f$ and let b be the weight of an accepting path of M starting from q and labeled with u. Then there exists a finite path of U starting from (q,u) and satisfying f such that at most b pairwise rendezvous transition are fired along it.

Doubly-indexed Formulae: We reduce the problem of computing cutoffs for double-indexed L(F) formulae f to single-index ones, Without loss of generality, each atomic proposition of f can be assumed to be of the form c or $\neg$ c, where c is control location of U. Rewriting $\neg$ c as the disjunction all the (finitely many) control states of U other than c, we can remove all negations from f. Let f=Eg. Then, by driving up the $\vee$ operator in g as far as possible we can write $g=g_1 \vee \ldots \vee g_k$, where for each i, $g_i$ does not contain the $\vee$ operator. Then, the minimum of the cutoffs for $Eg_1, \ldots, Eg_k$ is a cutoff for Eg. Thus, it suffices to compute cutoffs for Eg(1,2), where g(1,2) is a formula built using F, $\wedge$, but without $\neg$, and atomic propositions that are control states of U[1] and U[2] in U".

Note that with g(1,2), we can associate a set Seq of finite sequences of ordered pairs of the form $(c_i,d_j)$, where $c_i(d_i)$ is either true or a control state of U[1](U[2], etc. respectively) occurring in g(1,2), which capture all possible orders in which global states satisfying $c_i \wedge d_i$ can appear along computation paths satisfying g(1,2). For example, with the formula $c_0^1 \wedge F(c_1^0 \wedge c_2^1) \wedge Fc_3^2$, where $c_i^j$ is true if U[j] is currently in local control state $c_i$, we can associate the sequences. $(c_0^1,\text{true}),(\text{true},c_3^2),(c_1^0,c_2^1)$ and $(c_0^1,\text{true}),(c_1^0,c_2^1),(\text{true},c_3^2)$. Thus $U'' \models Eg(1,2)$ if there exists a sequence $\pi:(c_1,d_1), \ldots, (c_k,d_k)$ in Seq and a computation path x along which there exists global states satisfying $c_1 \wedge d_1, \ldots, c_k \wedge d_k$ in the order listed, viz., $x:g_\pi=c_1 \wedge d_1 \wedge F(c_2 \wedge d_2 \wedge F(\ldots))$. Then the minimum of the cutoff bounds for $f_\pi$, where $\pi \in$ Seq gives us the desired cutoff. Finally, the computation of cutoff bounds for $f_\pi$ can be reduced to those of single-index L(G) formulae via the following result. Given a formula $f=c_1 \wedge d_1 \wedge F(c_2 \wedge d_2 \wedge F(\ldots))$, the sum of the cutoffs for $f_1=c_1 \wedge F(c_2 \wedge F(\ldots))$ and $f_2=d_1 \wedge F(d_2 \wedge F(\ldots))$ is a cutoff bound for f.

Computing $N_c$. Given a control state c of U we now show how to compute $N_c$, viz., a cutoff for EFc. Let c be first included in $R_i$ in the ith iteration in the method A. The computation of $N_c$ is by induction on i. If i=0, viz., c is the initial state of U, $N_c=1$. Now, assume that $N_c$ is known for each $c \in R_i$, where i>0. Let $c \in R_{i+1}, R_i$. Then, there is a path of $U_{i+1}$ comprised of states of $R_i$ leading to c. Using WMA, we can, compute for each rendezvous transition tr, a bound on $n_{tr}$, the number of times tr is fired along a path of $U_{i+1}$ satisfying EFc. Also, since by the induction hypothesis, we know the value of $N_c$ for each c of $R_1$, a cutoff for EFc can be determined thus completing the induction step.

Example for computing cutoffs: cut+2 is a cutoff for f. Once all the control states c are flooded using processes $U_3, \ldots, U_{k+2}$, processes $U_1$ and $U_2$ can execute x[1,2] wherein each rendezvous transition fired by $U_1$ or $U_2$ synchronizes with one of the processes $U_3, \ldots, U_{k+2}$. For control state c of U, let $N_c$ be the cutoff for EFc, then cut'$\leq \Sigma_{c \in R} n_c N_c$. Since $N_c$ is a cutoff of EFc, there exists a computation $x_c$ of $U^{N_c}$ leading to a global state with a process in local state c. To get a global state with at least $n_c$ copies of c, we let processes U[1], . . . , $U[N_c]$ of $U^{n_c N_c}$ execute $x_c$ to reach a global state $s_1$ with at least one copy of c. Next, starting at $s_1$, we let processes $U[N_c+1], \ldots, U[N_c+n_c]$ execute $x_c$ to reach a global state $s_2$ with at least two copies of c. Repeating this process $n_c$ times results in a global state $s_{n_c}$ with at least $n_c$ copies of c. Repeating this process for each control state c, then gives us the desired result.

Cutoffs for B(P). For generating cutoffs for B(F) formulae, we start by recalling the standard procedure for model checking PDSs for mu-calculus formulae. We first take the product of the given PDS U with an alternating automaton/tableaux for the given formula f. Such products can be modeled as Alternating Pushdown Systems (APDSs). Then, model checking for f reduces to a pre*-closure computation for regular sets of configurations of the resulting APDS. These regular sets can be modeled as Alternating Multi-Automaton (AMA).

The procedure for computing cutoffs for B(F) formulae is similar to that for L(F), the only difference being that we use Weighted Alternating Multi-Automaton (WAMA) to capture the branching nature of the formulae where a state can now have a set of successors instead of just one. Thus, in a standard AMA each transition is a member of the set $(Q \times \Gamma) \times 2^Q$. Note that since f is a branching time property, the model for f is a computation tree of U. Thus while performing the pre*-closure computation, we need to keep track of the number of pairwise rendezvous fired along each branch of the computation trees encountered thus far. However, the number of pairwise rendezvous fired along different branches of a computation tree might, in general, be different and hence for each state outgoing transition needs to be assigned a different weight. Thus, each transition is now a member of the set $(Q \times \Gamma) \times 2^{Q \times Z}$.

Weighted Alternating Multi-Automaton (WAMA): Given a PDS $P=(P,\Gamma,c_0,\Delta)$, a WAMA is a tuple $M=(\Gamma,Q,\delta,I,F)$, where $\delta \subseteq (Q \times \Gamma) \times 2^{Q \times Z}$ and $M'=(\Gamma,Q, \delta',I,F)$ is an AMA where $$\delta' = \{(s, \{t_1, \ldots, t_m\}) | (s, \{(t_1, w_1), \ldots, (t_m, w_m)\}) \in \delta\}.$$

Updating the weights during the pre*-closure to compute the WAMA for AFg given the WAMA for g can be carried out in a similar fashion as for L(F) formulae the only difference being that the weights need to be updated for each successor. Let $M_0$ be a given WAMA accepting a set of regular configurations. Starting at $M_0$, we construct a series of WAMAs $M_0, \ldots, M_p$ resulting in the WAMA $M_p$. We denote by $\rightarrow_k$, the transition relation of $M_k$. Then for every $k \geq 0$, $M_{k+1}$ is obtained from $M_k$ by conserving the set of states and adding new transitions as follows: (i) For each internal transition $p_i \xrightarrow{\iota} p_j$, we add the transition $s_i \xrightarrow{\iota 0} s_j$ with weight 0. (ii) For each pairwise rendezvous send or receive transition $p_i \xrightarrow{\iota} p_j$, we add the transition $s_i \xrightarrow{\iota 1} s_j$ with weight 1. (iii) For each transition $(p_j, \gamma) \rightarrow \{p_{k_1}, w_1), \ldots, (p_{k_m}, w_m)\}$ and every set $s_{k_1} \xrightarrow{w_1}_i \{(p_{11}, b_{11}), \ldots, (p_{1i_1}, b_{1i_1})\}, \ldots, s_{k_m} \xrightarrow{w_m}_j \{(p_{m1}, b_{m1}), \ldots, (p_{mi_m}, b_{mi_m})\}$, we add a new transition $s_j \xrightarrow{\iota}_{i+1} \{(q_1, b_1), \ldots, (q_1, b_1)\}$, where for each j, $b_j$ is the maximum of all $b_{rj}$ where $p_{rj} = q_j$.

The Model Checking Procedure for L(G): Reasoning about a double-indexed LTL formula with infinite models is in general harder than the ones with finite models. This is because one has to now ensure that there exists an infinite computation of $U^m$, for some m, along which rendezvous transitions cannot only be recycled infinitely often but can be done so while maintaining context-free reachability. However, we exploit the fact that the dual of an L(G) formula is of the form Ag, where g is built using the temporal operator F and the boolean connectives $\wedge$ and $\vee$. Such formulae have finite tree-like models. However, note that $\exists n:U^n \models f$ if $\forall n:U^n \models \neg f$. Thus, if we resort to the dual of f, the resulting problem is no longer a PMCP. A method for the PMCP for L(G) is then the following: 1. Given an L(G) formula f, construct a B(F) formula g equivalent to $\neg$ f, viz., $U^n \models \neg f$ if $U^m \models g$. 2. Compute the cutoff cut for g. 3. For each $m \leq$ cut, check if $U^m \models g$.

The procedure for computing cutoffs for B(F) formulae was given above. For step 3, it suffices to check whether for each $m \leq$ cut, $U^m \models \neg g$, where $f = \neg g$ is an L(G) formula. But the model checking problem for L(G) formula for systems with a finite number of PDSs interacting via pairwise or asynchronous rendezvous is already known to be decidable. Thus, it can be shown how to construct a B(F) formula g equivalent to f.

Disjunctive Guards: we consider PMCP for PDSs interacting via disjunctive guards. Here transitions of U are labeled with guards that are boolean expressions of the form $\vee(c_1 \vee \ldots \vee c_k)$ with $c_1, \ldots, c_k$ being control states of U. In copy U[i] of template U in $U^n$, a transition $a \xrightarrow{\vee(c_1 \vee \ldots \vee c_k)} b$ of U is rewritten as a transition of the form $a \xrightarrow{\vee(c_1 \vee \ldots \vee c_k)} b$. In $U^n$ such a transition of U[i] is enabled in a global state s of $U^n$ if there exists a process U[j] other than U[i] in at least one of the local states $c_1, \ldots, c_k$ in s. Concurrent systems with processes communicating via boolean guards are motivated by Dijkstra's guarded command model. The PMCP for finite state processes communicating via disjunctive guards was shown to be efficiently decidable. As for pairwise rendezvous, the unbounded multiplicity result holds. Then, as before, the set of parameterized reachable control states can be computed efficiently. The procedure is similar to the one for PDSs interacting via pairwise rendezvous except that when constructing $R_{i+1}$ from $R_i$, in order to handle the synchronization constraints, we convert all transitions of the form $a \xrightarrow{\vee(c_1 \vee \ldots \vee c_k)} b$, where for some $j \in [1 \ldots k]:c_j \in R_i$, to an internal transition of the form $a \xrightarrow{r} b$. This is motivated by the fact that since $c_1$ is parameterized reachable, transition $a \xrightarrow{\vee_{c_1}(c_1 \vee \ldots \vee c_k)} b$ can always be enabled by ensuring, via the unbounded multiplicity result and a flooding argument, that for some j, there exists a process in local state $c_j$. We get: the Parameterized Model Checking Problem for control state reachability, for systems composed from a template PDS U interacting via disjunctive guards can be decided in $O(|U|^5)$ time, where $|U|$ is the size of U.

PMCP for Linear Time Formulae: Let $U_R$ be the PDS that we get from U by retaining only the parameterized reachable control states and all transitions between them that are either internal or labeled with a disjunctive guard which has at least one of the parameterized reachable control states as a disjunct. However, we replace each such transition labeled with a disjunctive guard with an internal transition making $U_R$ non-interacting. We first show via a flooding argument that for any double-indexed LTL\X formula g, for some n, $U^n \models Eg$ if $U_R^2 \models Eg$. By the unbounded multiplicity property, for some m, there exists a computation y leading to a global state of $U^m$ with at least one copy of each parameterized reachable control state of U. In a system with $U^{m+2}$ processes, we first let processes $U_3, \ldots, U_{m+2}$ execute y to flood all control states of U with multiplicity at least one. Then we are guaranteed that in any computation x (finite or infinite) of U[1,2], the transitions labeled with disjunctive guards can always be fired as there exists a process among $U_3, \ldots, U_{m+1}$ in each of the reachable control states. All such transitions can therefore be treated as internal transitions.

Binary Reduction Result: For any computation x of $U^n$, where $n \geq 2$, there exists a computation y of $U_R^2$ such that y is stuttering equivalent to x[1,2]. Note that the above result reduces the PMCP for any doubly-indexed LTL\X formula f to model checking for a system with two non-interacting PDSs for f. It follows that we need to consider only the fragments L(F) and L(G). For these fragments the problem of model checking a system with non-interacting PDSs is already known to be efficiently decidable. Thus, the PMCP for PDSs interacting via disjunctive guards is efficiently decidable for the fragments L(F) and L(G) and undecidable for the fragments L(U) and L(F,G).

Locks: We consider the PMCP for PDSs interacting via locks. Leveraging the cutoff result determined above, we have that for $n \geq 2$, $U^n \models f$ if $U^2 \models f$, where f is a doubly-indexed LTL\X formula. This reduces the problem of deciding the PMCP for f to a (standard) model checking problem for a system comprised of two PDSs interacting via locks.

We now distinguish between nested and non-nested locks. A PDS accesses locks in a nested fashion if it can only release the last lock it acquired and that has not been released. For a system with two PDSs interacting via nested locks, the model checking problem for systems with two PDSs is known to be efficiently decidable for both fragments of interest, viz., L(F) and L(G). So, the PMCP for L(F) and L(G) for PDSs interacting via nested locks is decidable in polynomial time in the number of control states of the given template U and exponential time in the number of locks of U.

For the case of non-nested locks, we show that the PMCP is decidable for L(G) but undecidable for L(F). For L(F) the undecidability result follows by reduction from the problem of model checking a system comprised of two PDSs $P_1$ and $P_2$ interacting via non-nested locks for the formula $EF(c_1 \wedge c_2)$ which is known to be undecidable.

The PMCP for $EF(c_1 \wedge c_2)$, and hence L(F), is undecidable for PDSs interacting via non-nested locks. For L(G), it can be shown that the problem of model checking a system with PDSs interacting via locks for an L(G) formula f can be reduced to model checking an alternate formula f' for two non-interacting PDSs. Given a template U interacting via the locks $l_1, \ldots, l_k$, we construct a new template V with control states of the form $(c, m_1, \ldots, m_k)$. The idea is to store whether a copy of U is currently in possession of lock $l_i$ in bit $m_i$ which is set to 1 or 0 accordingly as $U_i$ is in possession of $l_i$ or not, respectively. Then, we can convert V into a non-interacting PDS by removing all locks from V and instead letting each transition of V acquiring/releasing $l_i$ set $m_i$ to 1/0. However, removing locks makes control states which were mutually exclusive in $U^2$ simultaneously reachable in $V^2$. In order to restore the lock semantics, while model checking for an L(G) property of the form Eg, we instead check for the modified L(G) property $E(g \wedge g')$, where $g' = G(\wedge_i (\neg m_i^1 \vee \neg m_i^2))$ with atomic proposition $m_i^j$ evaluating to true in global state s if in the local control state $(c, m_i^j, \ldots, m_k^j)$ process $V_j$ in s, $m_i^j = 1$. Note that g' ensures that in the control states of $V_1$ and $V_2$, for each i, the $m_i$-entry corresponding to lock $l_i$ cannot simultaneously be 1 for both V[1] and V[2], viz., U[1] and U[2] cannot both hold the same lock $l_i$. Then, the problem reduces to model checking two non-interacting PDS for L(G) formulae which is known to be decidable. This gives that the PMCP for L(G), is efficiently decidable for PDSs interacting via non-nested locks.

Broadcasts: We consider the PMCP for PDSs communicating via broadcasts. Here, $\Sigma$, the set of action symbols of U, is comprised of the set $\Sigma_{in}$ of internal transition labels; and the sets $\Sigma_{pr} \times \{!!\}$ and $\Sigma_{pr} \times \{??\}$ of send and receive broadcasts transitions, respectively. Like asynchronous rendezvous, a broadcast send transition that is enabled can always be fired. A broadcast receive transition can only be fired if there exists an enabled matching broadcast send transition. Broadcasts differ from asynchronous rendezvous in that executing a broadcast send transition forces not merely one but all other processes with matching receives to fire. It can be shown that for PDSs interacting via broadcasts, the PMCP for pairwise reachability, viz., $EF(c_1 \wedge c_2)$ is undecidable. The undecidability result for L(F) then follows as an immediate corollary. The PMCP for L(F) is undecidable for PDSs interacting via broadcasts.

We consider the PMCP for PDSs interacting via each of the standard synchronization primitives for a broad class of temporal properties. Specifically we have delineated the decidability boundary of the PMCP for PDSs interacting via each of the standard synchronization primitives for doubly-indexed LTL. We have also demonstrated that in many important cases of interest the PMCP is more tractable than the standard model checking problem. The practical implications of the new results are that in many applications like Linux™ device drivers, it may be more useful to consider the PMCP than the standard model checking problem.

Having described preferred embodiments of a system and method for inter-procedural dataflow analysis of parameterized concurrent software (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method implemented by a computer for computing dataflow in concurrent programs of a computer system, comprising:

given a family of threads $(U^1, \ldots, U^m)$ and a Linear Temporal Logic (LTL) property, f, for a concurrent program, computing a cutoff for the LTL property, f, where c is called the cutoff if for all n greater than or equal to c, $U^n$ satisfies f if $U^c$ satisfies f, the cutoff being computed using weighted multi-automata for internal transitions of the threads; and model checking a cutoff number of processes to verify data race freedom in the concurrent program.

2. The method as recited in claim 1, wherein the step of model checking includes establishing data race freedom in a concurrent program with at least two distinct drivers, each running respective threads, by establishing data race freedom in a parameterized system comprised of a plurality of copies of the respective threads.

3. The method as recited in claim 1, wherein the step of model checking includes establishing data race freedom in an undecidable concurrent program by establishing data race freedom in a parameterized system including the undecidable concurrent program.

4. The method as recited in claim 1, wherein the threads are modeled as push down systems (PDSs).

5. The method as recited in claim 1, wherein the threads interact with each other using synchronization primitives.

6. The method as recited in claim 1, wherein the synchronization primitives include at least one of pairwise rendezvous, asynchronous rendezvous, disjunctive guards, broadcasts, nested locks and non-nested locks.

7. The method as recited in claim 1, wherein f is a double-indexed LTL formula.

8. The method as recited in claim 1, wherein using weighted multi-automata for internal transitions of the threads includes estimating a bound on a number of transitions fired in transit between two control states.

9. A method implemented by a computer for computing dataflow in a computer program of a computer system, comprising:

given a family of threads modeled as pushdown systems $(U^1, \ldots, U^m)$ which interact by synchronization primitives and a Linear Temporal Logic (LTL) property, f, for a concurrent program, computing a cutoff for the LTL property, f, by computing bounds on a number of transitions fired along a computation of a thread between reachable control states of the concurrent program where the bounds are computed using weighted multi-automata on internal transitions of the threads; and model checking a cutoff number of processes by parameterized model checking to verify data race freedom in the concurrent program.

10. The method as recited in claim 9, wherein the step of model checking includes establishing data race freedom in a concurrent program with at least two distinct drivers, each running respective threads, by establishing data race freedom in a parameterized system comprised of a plurality of copies of the respective threads.

11. The method as recited in claim 9, wherein the step of model checking includes establishing data race freedom in an undecidable concurrent program by establishing data race freedom in a parameterized system including the undecidable concurrent program.

12. The method as recited in claim 9, wherein the synchronization primitives include at least one of pairwise rendezvous, asynchronous rendezvous, disjunctive guards, broadcasts, nested locks and non-nested locks.

* * * * *